D. M. BERNARD.
DRAWING AND MEASURING INSTRUMENT.
APPLICATION FILED JULY 10, 1916.
1,301,092.
Patented Apr. 22, 1919.
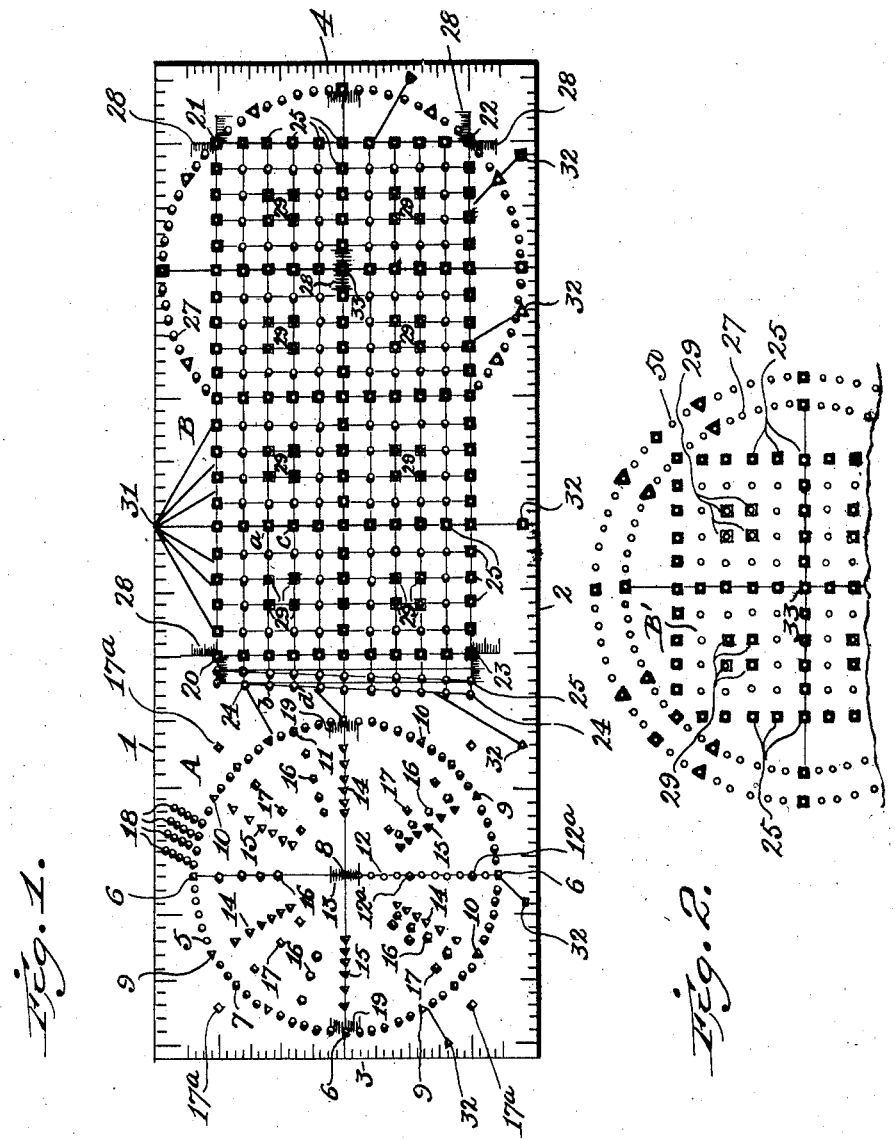

UNITED STATES PATENT OFFICE.

DAVID MEADE BERNARD, OF JACKSONVILLE, FLORIDA.

DRAWING AND MEASURING INSTRUMENT.

1,301,092.  Specification of Letters Patent.  Patented Apr. 22, 1919.

Application filed July 10, 1916. Serial No. 108,428.

*To all whom it may concern:*

Be it known that I, DAVID MEADE BERNARD, a citizen of the United States of America, and a resident of Jacksonville, county of Duval, State of Florida, have invented certain new and useful Improvements in Drawing and Measuring Instruments, of which the following is a full and clear specification.

My invention relates to drawing and measuring instruments, and more particularly to that class of instruments comprising a thin sheet of, preferably, transparent or translucent material, such as celluloid, containing perforations for enabling students and draftsmen to readily make their drawings in connection with their studies in geometry and descriptive geometry, and for other purposes, without the use of a compass, T-square, triangle, or other customary drafting instruments.

The main object of the invention is to give to each measuring point, or to certain of them, or to each set of measuring points a distinguishing characteristic, so that they may be readily singled out from the other points, without having to count them or to study out their location.

This distinguishing characteristic is obtained at the measuring point either by the color or shape of the point or both the color and shape, or by making the perforations at different points of different or distinguishing shapes, or by making the perforations at these points of the same shape, as circular, and surrounding them by differently shaped fields or lines, such as various regular or substantially regular geometrical figures, as triangles, squares, pentagons, etc., by differently colored fields of the same or different sizes, or any combination of such characteristics.

The arrangement of the perforations is such as to serve for the drafting of studies in both polar and angular coördinates, including means for exact measurements of linear and circular dimensions, and for other purposes.

Referring to the drawings, in which like parts are similarly designated,

Figure 1 shows in actual size one of the many forms that my invention may take, and I have here illustrated a rectangularly shaped instrument, preferably oblong, whose straight edges are engine divided into inches and fractions of inches.

Fig. 2 illustrates a modified arrangement of perforations of a square field and two concentric protractors.

In the instrument illustrated in Fig. 1 the two long edges, 1 and 2, are decimally divided, namely into tenths of an inch, and the short edges, 3 and 4, are divided into sixteenths of an inch. Any other scales may be used, metric, logarithmic, &c., and the subdivisions may be carried to any degree of fineness found necessary or desirable.

At one side of the instrument, here shown as the left hand side, I provide a perforated field, designated A, and comprised mostly within a circular row of perforations 5.

The perforations 6, forming part of the circular row of perforations, and determining the ends of a pair of rectangular diameters of the circle parallel with the sides of the instrument, are distinguished from other perforations by being made square. Another set of perforations 7, also square, forming part of the circular row of holes, are placed at the end of a second pair of rectangular diameters displaced 45° from the first set of square perforations 6, but are differently related to the radii of the circle whose center is at 8. The perforations 6 have two sides substantially perpendicular to their radii, while the squares 7 are so arranged that the radii pass diagonally through them. In this manner the 45° angles are quickly and easily distinguished from the 90° angles and angles of other dimensions.

The perforations 9 are triangular and point inward and are arranged 30° from the rectangular axes of the circle 5, while those 10 are also triangular but point outward, and are arranged 60° from the rectangular axes of the circle 5, so that the 30° angle can be easily determined from the 60° angle, and from the other angles.

The holes in the row 5 are circular except as previously noted, and, for convenience, regularly spaced, the spacing being chosen with regard to the diameter of the circle, a small circle requiring a greater number of degrees between the holes than a larger circle. In the drawing the spacing chosen is five degrees of arc.

One of the radii of the circle 5, here shown as the lower, vertical radius, is regularly divided by a row of holes 12, to indicate units of length, for measuring the length of polar coördinates, there being at the center of the circle a scale 13 of subdivisions of the spaces between the holes 12. Every fifth hole, 12ª, is made square, to facilitate counting.

Within the circle 5 are six radial rows of triangular perforations, 14, 15, the triangles 14 pointing inward, and those 15 pointing outward and forming the vertices of two sets of concentric equilateral triangles, and taken together forming the vertices of concentric regular hexagons.

There are also radial rows of pentagonal holes 16, and of square holes 17, forming respectively the vertices of concentric pentagons and squares.

Radial holes for the squares, pentagons and hexagons are so arranged that each can be inscribed in a circle about which the next larger can be circumscribed, all having a common center at 8.

I have found this exceptionally useful in assisting students to draw inscribed and circumscribed regular figures, but the systems of holes may, if desired, be arranged so that their apices are spaced apart at regular radial distances.

In order to obtain a finer subdivision of the circle 5, a few of the spaces are provided with rows of holes 18 so inclined to the radii of the circle 5 that they subdivide the space between adjacent holes. For example, if the space between the holes of the circle 5 is five degrees, the rows 18 are arranged to subdivide this five degree space into single degrees, the five degree space being too small to accommodate intermediate single degree holes.

Lined or ruled subdivisions are placed at 19 at the ends of the horizontal diameter for convenience in measuring angles, but they are not perforated, as the scales 18. The radial lines of holes need not terminate at the circle 5, but may extend outside the same, as indicated at 17ª for the squares.

In order to draw figures of a greater number of sides, say decagons, I first indicate the vertices of a pentagon and then turn the instrument about 8 as center 36° and indicate a second set of pentagonal vertices through the same holes.

Adjacent the circle 5 is a rectangular field B, or system of holes, 20, 21, 22, 23, the holes of which for convenience are placed two-tenths of an inch apart, there being eleven horizontal rows and twenty-one vertical rows of holes all of the same shape, namely circular. In addition to these there are two inclined rows of holes 24 and 25, and these holes lie in line, horizontally, with the horizontal rows of holes in the rectangular system or field B.

Each hole in the rows 24 and 25 is removed to the left of the one next above it a distance of one one-hundredth of an inch. The distance $a$—$b$ for example, is 1.22 inches, while that $c$—$d$ is 1.23 inches, so that distances accurate to one-hundredth of an inch can be measured. These distances can not only be measured, but since the instrument is transparent and perforated, they can be laid off.

Radii can thus be measured and circles drawn of any desired radii within the limits of the instrument, a pencil point being inserted in one hole and held stationary as a center, and a pencil point inserted in another hole and the instrument rotated about the stationary point, at the same time marking the circular line on the paper beneath.

By the rectangular system of holes 20, 21, 22, 23, rectangular coördinates are easily measured.

The system is divided into sub-fields or square inches by holes having distinguishing characteristics, namely by round holes having fields surrounding them as shown at 25, and here shown as square. Any other distinguishing shape may be chosen.

The holes 29 in the middle of each square inch, or sub-field, are distinguished by a rectangle drawn around them, or by any other figure.

A three-quadrant row of holes 27 is circumscribed about one end of the rectangular system with its center at 28, and is perforated in a manner similar to the circle 5, except that circular holes passing through small polygons are used where polygonally shaped holes were used on circle 5. This enables the entire rectangular system to be rotated about 28 as center to any angle determined by the holes 27.

It will be noted that the sides of the rectangle 20, 21, 22, 23, are extended at the corners and lined sub-divisions 28 placed thereon. The length of these extensions is chosen as one unit, or two-tenths of an inch, but they may be of greater or less extent, if desired. A scale 33 is placed at the center 28, similar to scale 13.

At the upper edge I take a point as at 31, for the center of an incomplete protractor having lines radiating from 31 and terminating in holes having distinguishing characteristics near the other edges of the instrument, such holes, 32, being for the principal angles used by students. The holes 32 characterized by the small squares through which they pass designate angles divisible by 45 degrees, while those holes characterized by the small triangles through which they pass designate angles divisible by 30 degrees and not by 45 degrees. The 30 degree divisions in each quadrant are distinguished from the 60 degree divisions by making the triangles point differently with reference to center 31. Likewise the 45 degree divisions are distinguished from the zero and 90 degree divisions by making the said squares point differently with reference to center 31.

The rectangular system 20—21—22—23 as here shown by way of illustration, is divided into eight sub-fields, each one square inch in area, and at the middle of each field is a set of four holes 29 determining the rectangular central area.

Each of the eight areas or the right-hand and left-hand of the halves of the system or field B may be used for drawing or determining geometrical figures in one portion either equal or similar to those in another portion, or figures drawn within the circle 5, and without shifting the instrument.

The rectangular system also enables the student to construct various and numerous symmetrical and asymmetrical figures with respect to a center, or to either of the rectangular axes, and to locate these figures with respect to their coördinates, whether these coördinates be rectangular, polar, or in accordance with other systems.

In general, the drafting instrument is an assistant to the student in constructing figures required in the study of trigonometry, geometry, and descriptive geometry. It is thin, transparent, and preferably but not necessarily flexible. It is convenient, for the reason that the usual draftsman's needle point can directly prick the points determining the lines bounding the figures at their required angles.

With 28 as a center and the protractor 27 as a measure of arc, the entire instrument can be rotated about 28 so as to position the field A at any desired angle for marking of regular or irregular geometric figures.

With 8 as a center and the protractor 5 as a measure of arc, the instrument can be rotated about 8 so as to position the field B at any desired angle for the marking of regular, irregular, symmetric, and asymmetric figures, and the instrument may then in turn be rotated about 28, thus positioning the figures not merely with reference to center 8, but also with reference to center 28, or if desired I may first use 28 as center and then 8.

If it is desired to locate regular polygons with reference to a point, the distance between the center of the polygon and the point being less than the distance from 8 to 28, I start by revolving the instrument about 28, and using the perforations along the line of centers, locate the centers of the polygons. I then make 8 cover these centers and revolve the instrument until the desired regular polygon is properly positioned.

The principal measurements, angular or linear, are differently designated by distinguishing characteristics at their points of measurement by holes which themselves form different fields by reason of their shapes, or by holes of the same shape surrounded by differently shaped fields either solid or in outline.

In Fig. 2 I have shown the rectangular field B' divided by the holes 25 into quarters and the central area or mid-field of each quarter distinguished by the holes 29. A protractor 27 circumscribes the field B', the structure being identical with the right hand end of Fig. 1, but with the addition of a second concentric protractor 50 similar to the one 27.

It will thus be seen that I have produced a short, convenient drafting instrument without requiring a single numeral or letter thereon, yet clearly and accurately determining and distinguishing any angle, and most of the regular polygons that can be used with advantage by any student from the graded schools through his university course.

I claim—

1. A drafting instrument having thereon a plurality of small polygons, not all of the same shape, each of which represents a measuring point and differentiates its function from that of some other of said measuring points and furthermore suggests, by reason of its geometric properties, the figure which the measuring point that it represents is designed primarily to aid in determining.

2. A drafting instrument on which a plurality of small substantially regular polygons, not all of the same shape, are each used to designate a vertex of a regular polygon, all of whose vertices are located on the instrument, the number of sides of each said small polygon being contained an integral number of times into the number of sides of the regular polygon one of whose vertices it designates.

3. A drafting instrument on which certain small polygons, not all of the same shape, are each used to designate a vertex of a polygon, all of whose vertices are located on the instrument, each said small polygon being substantially similar to the polygon one of whose vertices it designates.

4. A drafting instrument on which certain small polygons, not all of the same shape, are each used to designate a vertex of a polygon, all of whose vertices are located on the instrument, each said small polygon being substantially similar to the polygon one of whose vertices it designates, and certain of said small poylgons being distinguished from certain others of the same shape by being made to point differently with reference to a definite point of the instrument, 5. A drafting instrument having a protractor scale the angular divisions of which are located with reference to a common point and a common line, said protractor scale having divisions which denote angles divisible by 45 degrees designated each by a substantially regular quadrilateral and the angular divisions which denote angles divisible by 30 degrees and not divisible by 45 degrees designated each by a substantially equiangular triangle.

6. A drafting instrument having a protractor scale the angular divisions of which are located with reference to a common point and a common line, said protractor scale having divisions which denote angles divisible by 45 degrees designated each by a substantially regular quadrilateral and the angular divisions which denote angles divisible by 30 degrees and not divisible by 45 degrees designated each by a substantially equiangular triangle, and furthermore certain of said designating polygons being distinguished from certain others of the same shape by being made to point differently with reference to the center of said protractor scale.

7. A drafting instrument on which certain measuring points are designated and located by small substantially regular polygonally shaped perforations, not all of the same shape, the polygonally shaped perforation which designates and locates each point suggesting, by reason of some well known geometric property which it possesses, the primary function of the point which it locates and designates and furthermore differentiates between the primary function of said measuring point and the primary function of some other of said measuring points.

8. A drafting instrument on which certain small polygonally shaped perforations are each used to locate and designate a vertex of a regular polygon, all of whose vertices are located within the instrument, the number of sides of the polygonal shape distinguishing each perforation before mentioned being contained an integral number of times into the number of sides of the regular polygon one of whose vertices that perforation locates and designates, and the designating perforations being smaller than the polygons whose vertices they are designed primarily to respectively designate.

9. A drafting instrument on which certain polygonally shaped perforations are each used to locate and designate a vertex of a polygon, all of whose vertices are located within the instrument, the polygonal shape distinguishing each of said perforations being substantially similar to the polygon one of whose vertices it locates and designates, and the designating perforations being smaller than the polygons whose vertices they are designed primarily to respectively designate.

10. A drafting instrument on which certain polygonally shaped perforations are each used to locate and designate a vertex of a polygon, all of whose vertices are located within the instrument, the polygonal shape distinguishing each of said perforations being substantially similar to the polygon one of whose vertices it locates and designates, and furthermore certain of said polygonally shaped perforations being distinguished from certain others of the same shape by being made to point differently with reference to a definite point of said instrument, and the designating perforations being smaller than the polygons whose vertices they are designed primarily to respectively designate.

11. A drafting instrument containing a protractor scale having divisions which denote angles divisible by 45 degrees designated each by a small substantially square perforation and having divisions which denote angles divisible by 30 degrees and not by 45 degrees designated each by a substantially equiangular triangular perforation.

12. A drafting instrument containing a protractor scale having divisions which denote angles divisible by 45 degrees designated each by a small substantially square perforation and having divisions which denote angles divisible by 30 degrees and not by 45 degrees designated each by a substantially equiangular triangular perforation, and having certain of said polygonal perforations distinguished from certain others of the same shape by being made to point differently with reference to the center of said protractor scale.

13. A drafting instrument containing a plurality of perforations which are designated by small polygons, not all of the same shape, through which the perforations respectively pass, said polygons differentiating between the functions of certain of said perforations and furthermore suggesting respectively, by reason of their respective geometric properties, the figures which the perforations that they respectively designate are designed primarily to aid in determining.

14. A drafting instrument on which certain perforations designated by small polygons, not all of the same shape, through which the perforations respectively pass, are each used to locate a vertex of a regular polygon, all of whose vertices are located within the instrument, the number of sides of the polygon designating each said perforation being contained an integral number of times into the number of sides of the regular polygon at one of whose vertices the perforation which it designates is placed.

15. A drafting instrument on which certain perforations designated by small polygons, not all of the same shape, through which the perforations respectively pass, are each used to locate a vertex of a polygon, all of whose vertices are located within the instrument, each said small polygon being substantially similar to the polygon at one of whose vertices the perforation which it designates is located.

16. A drafting instrument on which certain perforations designated by small polygons, not all of the same shape, through which the perforations respectively pass, are each used to locate a vertex of a polygon, all of whose vertices are located within the instrument, each said small polygon being substantially similar to the polygon at one of whose vertices the perforation which it designates is located, and furthermore certain of said perforations which are designated by polygons of the same shape being differentiated between by pointing their designating polygons differently with reference to a definite point of the instrument.

17. A drafting instrument containing a protractor scale having divisions which denote angles divisible by 45 degrees designated each by a small perforation which is inclosed within a small substantially regular quadrilateral, and said protractor scale having divisions which denote angles divisible by 30 degrees and not by 45 degrees designated each by a small perforation which is inclosed within a small substantially equiangular triangle.

18. A drafting instrument containing a protractor scale having divisions which denote angles divisible by 45 degrees designated each by a small perforation which is inclosed within a small substantially regular quadrilateral, and said protractor scale having divisions which denote angles divisible by 30 degrees and not by 45 degrees designated each by a small perforation which is inclosed within a small substantially equiangular triangle, and certain of said polygons which inclose the said perforations being distinguished from certain others of the same shape by being made to point differently with reference to the center of said protractor scale.

19. A transparent drafting instrument having a rectangular portion regularly divided by horizontal and vertical intersecting rows of perforations the rows of perforations being spaced equidistant apart and the perforations of each row being spaced the same distance apart as the rows themselves, and said instrument having placed thereon along the prolongations of intersecting sides of said rectangular portion intersecting measuring scales giving fractional measurements of the distance between consecutive perforations of a row.

20. A transparent drafting instrument having a rectangular portion regularly divided by horizontal and vertical intersecting rows of perforations the rows of perforations being spaced equidistant apart and the perforations of each row being spaced the same distance apart as the rows themselves, and said rectangular portion having certain rows distinguished from others whereby it is subdivided into equal areas, and said instrument having placed thereon along the prolongations of intersecting sides of said rectangular portion intersecting measuring scales giving fractional measurements of the distance between consecutive perforations of a row.

21. A drafting instrument having a rectangular portion regularly divided in transverse directions, and an arcuate row of perforations circumscribing one end of said portion.

22. A drafting instrument having a rectangular portion regularly divided in transverse directions, and an arcuate row of perforations circumscribing one end of said portion, the perforations of this arcuate row having distinguishing characteristics for the main angles, and the sides of the rectangular portion having graduated lined extensions.

23. A drafting instrument having a rectangular portion having rectangular parallel intersecting lines of division and perforated at the intersection points, and a protractor scale circumscribing said portion whose angular measurements are indicated by perforations.

24. A drafting instrument having a rectangular portion having parallel intersecting lines of divisions, the intersections of said lines being perforated, said portion being divided into areas and having a circumscribing protractor scale.

25. A drafting instrument having a rectangular portion divided in longitudinal and transverse directions, the divisions being indicated by perforations, and a protractor circumscribing said portion whose angular divisions are indicated by perforations, the perforations for the main angles being provided with distinguishing characteristics.

26. A drafting instrument having a rectangular portion divided in longitudinal and transverse intersecting directions, the intersections of the divisions being indicated by perforations, said portion divided into areas whose perforations are provided with distinguishing characteristics, and said rectangular portion having a circumscribing protractor scale whose angular divisions are indicated by perforations, the perforations at the main divisions being provided with distinguishing geometrical figures.

27. A drafting instrument having a rectangular portion divided in longitudinal and transverse intersecting directions and having perforations at the points of division, said portion divided into like areas and each area having a central area denoted by differently indicated perforations, and a circumscribing protractor scale for the end of said rectangular portion.

28. A drafting instrument having a rectangular portion divided in longitudinal and transverse intersecting directions and having perforations at the points of intersection, said portion divided into like areas and each area having a central part provided with distinguished perforations, and a circumscribing protractor scale for the end of said rectangular portion whose angles are indicated by perforations distinguished by geometrical figures.

29. A drafting instrument having a rectangular portion having intersecting longitudinal and transverse lines of divisions, said portion having a protractor scale arc passing through corners thereof.

30. A drafting instrument having a rectangular portion having intersecting longitudinal and transverse lines of divisions, said portion divided into equal areas and each area having a designated central portion, and a protractor scale passing through corners of said rectangular portion.

31. A drafting instrument having a rectangular portion perforated at the intersection of regular transverse and longitudinal lines of division thereof, and at one end of said portion, a system of perforations rectilinearly arranged, the alinement of the perforations being oblique to the rows of perforations of said rectangular portion in one direction and the perforations of said system being in alinement with the perforations of said rectangular portion in another direction, whereby fractional measurements can be determined, and an arcuate row of protractor scale perforations passing through the corners at the opposite end of said portion, the edges of said portion having graduated ruled extensions, and the center of the arcuate row of perforations passing through the corners having ruled graduations placed in close proximity thereto.

In testimony whereof I hereunto affix my signature.

DAVID MEADE BERNARD.